United States Patent [19]

Moller

[11] 4,108,334

[45] Aug. 22, 1978

[54] APPARATUS FOR FEEDING SCRAP AND BASE PLASTICS MATERIAL TO AN EXTRUDER

[75] Inventor: Richard W. Moller, Grand Blanc, Mich.

[73] Assignee: Hydreclaim Corporation, Grand Blanc, Mich.

[21] Appl. No.: 638,911

[22] Filed: Dec. 8, 1975

[51] Int. Cl.² .................. B01F 7/08; B01F 7/24
[52] U.S. Cl. .................. 222/136; 222/145; 222/412; 366/177; 366/322
[58] Field of Search ............. 222/412, 413, 135, 145, 222/136; 198/213, 676; 259/6, 21

[56] References Cited

U.S. PATENT DOCUMENTS

| | | | |
|---|---|---|---|
| 66,487 | 7/1867 | Gregg | 198/213 |
| 292,550 | 1/1884 | Fairly | 198/213 X |
| 376,552 | 1/1888 | Rossler | 198/213 |
| 2,517,456 | 8/1950 | Wherrett | 259/7 |
| 2,797,702 | 3/1974 | Robertson | 222/136 X |
| 3,182,969 | 5/1965 | Rupp | 259/97 X |
| 3,219,320 | 11/1965 | Sutter | 259/97 X |
| 3,393,899 | 7/1968 | Wells | 259/6 X |
| 3,552,722 | 1/1971 | Sutter | 259/21 |
| 3,871,629 | 3/1975 | Hishida | 222/136 X |

*Primary Examiner*—Robert B. Reeves
*Assistant Examiner*—Frederick R. Handren
*Attorney, Agent, or Firm*—Learman & McCulloch

[57] ABSTRACT

Apparatus for feeding plastic scrap and base material to an extruder comprises a scrap hopper to which scrap material is delivered for discharge through an outlet conduit leading to an extruding machine. The scrap plastic is fed through the conduit by means of an auger-like feed screw. Virgin or base plastic material is introduced to the scrap hopper outlet conduit and is mixed with the scrap prior to its discharge to the extruder. The base plastic material is delivered from a supply thereof to a receiver in which is an auger-like feed screw which feeds the base material into the scrap hopper outlet. At least the scrap feed screw comprises a rotary shaft having a discontinuous helical vane thereon constituted by a plurality of individual, segment-shaped members which are spaced longitudinally and circumferentially of the shaft. The discontinuity of the vane provides for slippage between the feed screw and the scrap material so as to facilitate the introduction of base plastic material into the scrap hopper outlet conduit.

15 Claims, 4 Drawing Figures

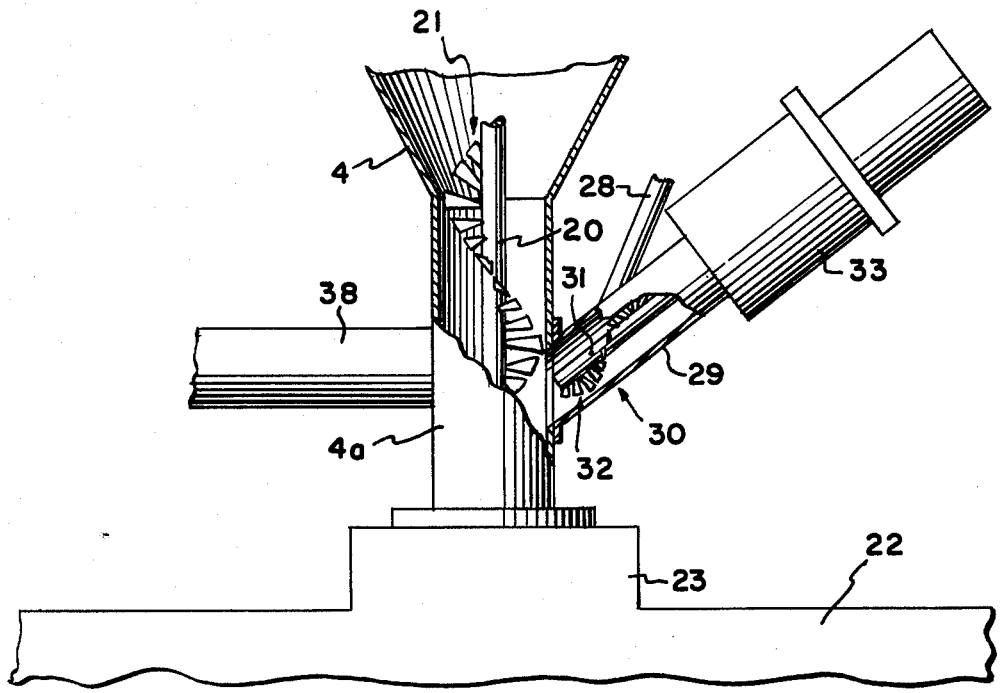
FIG.2
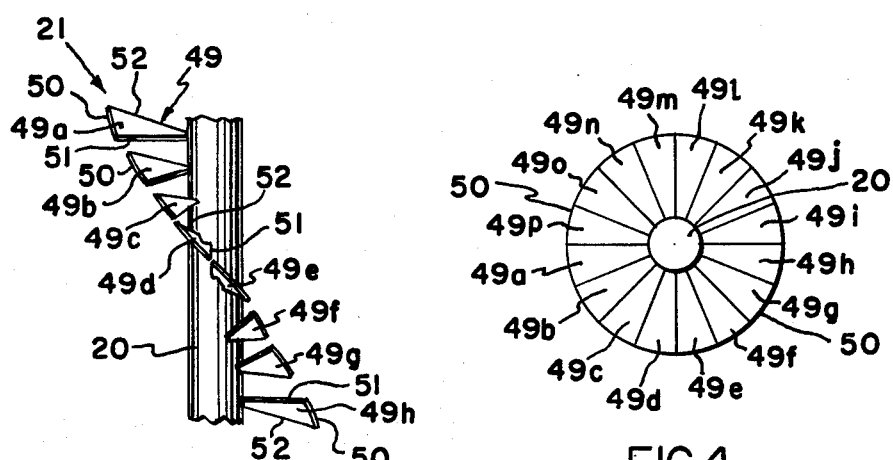
FIG.3
FIG.4

APPARATUS FOR FEEDING SCRAP AND BASE PLASTICS MATERIAL TO AN EXTRUDER

This invention relates to apparatus for supplying a plastics extruder with a mixture of scrap and virgin or base plastics materials, the scrap and base materials being blended and liquified in the extruder and subsequently discharged therefrom to manufacture any one of a number of various plastics articles. The scrap is obtained from imperfectly formed articles, from trimming of previously formed articles, or elsewhere.

It is a common practice to mix scrap and virgin plastics materials so as to take advantage of the economies resulting from the utilization of the scrap. Scrap material rarely appears in a form in which it may be mixed with virgin material. Accordingly, it is conventional to chop or grind the scrap material prior to its being mixed with the virgin material. The prepared scrap thus is rather fluffy as compared to the virgin material which customarily is in the form of dense, solid pellets.

The mixing of fluffy and solid plastics materials creates certain difficulties due to the differences in densities of the respective materials. Gravitational delivery of scrap and virgin material to the inlet of the extruder is unsatisfactory inasmuch as the density of the virgin material is greater than that of the scrap and thus has better gravitational flow characteristics. Accordingly, it is common practice to collect the scrap in a hopper and discharge the scrap therefrom by means of a rotary feed screw or auger. In this kind of operation, the scrap entrained by the auger is compressed between adjacent convolutions of the auger vane or flight. As a consequence, the compressed scrap resists the introduction thereto of the base material. In those instances in which the base material is fed forcibly into the scrap by means of a feed screw or the like, both the scrap and the base material are subjected to compressive forces which generate heat. The generation of heat in the mixing stage is undesirable inasmuch as such heat may result in premature liquification of the plastics material.

In many instances it is necessary to introduce coloring material to the plastics material prior to the introduction of the latter to the extruder. The same problems associated with the mixing of scrap and base materials are encountered in the introduction of the coloring material.

An object of this invention is to provide apparatus for mixing scrap and base plastics material and which provides for the mixing of such materials without the generation of excessive heat.

Another object of the invention is to provide a feeding mechanism especially adapted for use in apparatus of the kind referred to above.

Other objects and advantages of the invention will be pointed out specifically or will become apparent from the following description when it is considered in conjunction with the appended claims and the accompanying drawings, wherein:

FIG. 2 is an enlarged, vertical sectional view of the apparatus for delivering a mixture of scrap and base plastics material to an extruder;

FIG. 3 is an enlarged elevational view of a typical feed screw; and

FIG. 4 is an end elevational view of the screw shown in FIG. 3.

Figure 1:
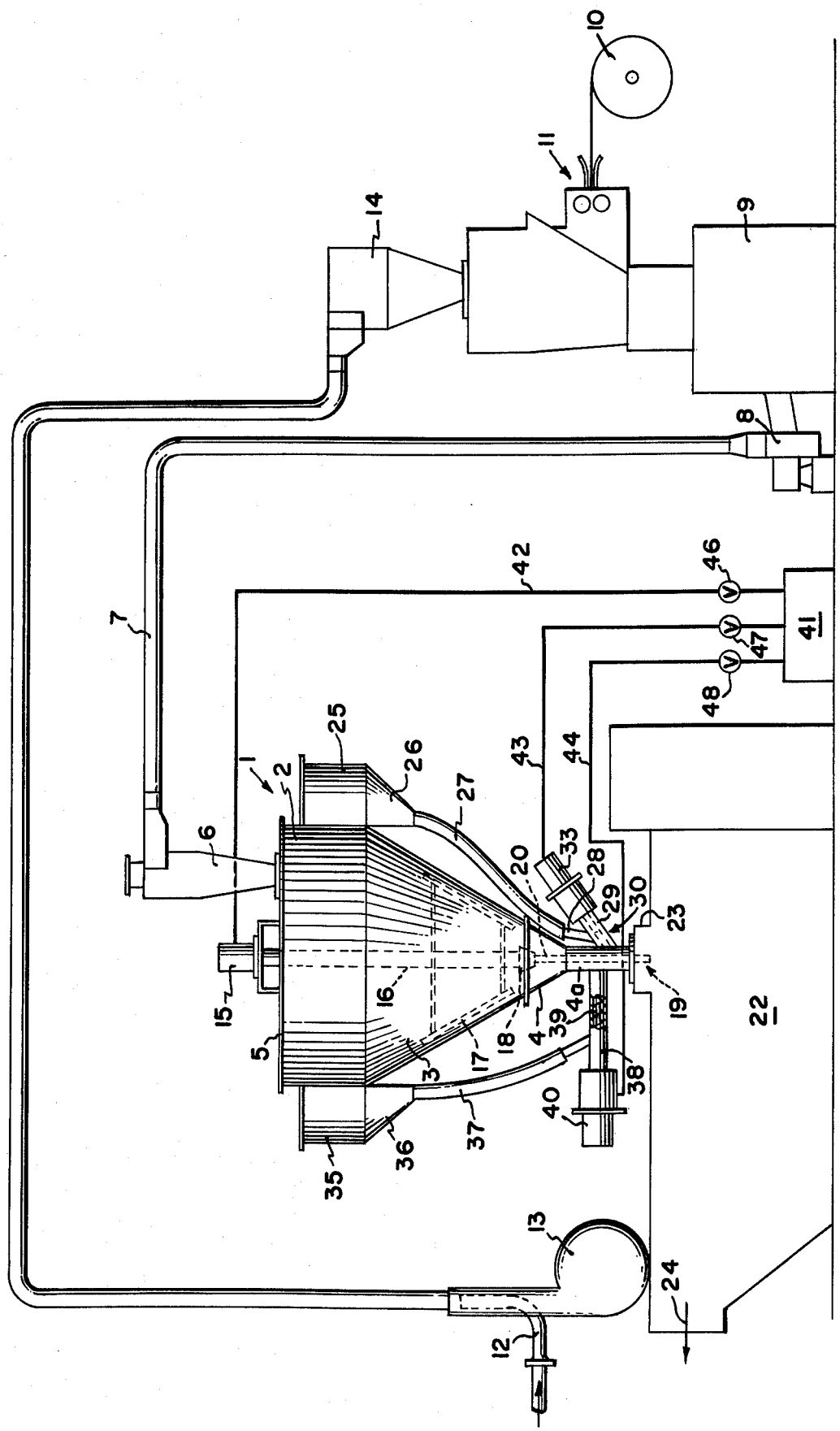
FIG. 1 is a partly diagrammatic side elevational view of apparatus constructed in accordance with the invention.

Apparatus constructed in accordance with the invention comprises a scrap hopper 1 having an upper, cylindrical body portion 2 fitted at its lower end to a conical bottom 3 that terminates at its lower end in a funnel-shaped outlet conduit 4 having a cylindrical lower tube 4a. The upper end of the hopper 1 is closed by a cover 5 provided with an opening therein for communication with the discharge end of a cyclone separator 6. The separator 6 communicates via ducting 7 with a motor driven blower 8 which receives scrap plastic from a granulator 9 via a conduit. Scrap material is supplied to the granulator 9 in either or both of two ways. Rolled or sheet scrap material 10 may be fed to the granulator by a powered roll assembly 11. Trim scrap may be delivered to the granulator via ducting 12 through which scrap is blown by a blower 13 to a cyclone separator 14 which communicates with the granulator 9. In either event, the hopper 1 is supplied with ground or chopped scrap material.

Means is included for stirring or agitating the scrap material in the hopper 1 and comprises a preferably hydraulic motor 15 supported on the cover 5 and having a driven shaft 16 which extends into the hopper through an opening in the cover. Agitating blades 17 of conventional design are fixed to the shaft 16 for rotation therewith. At the level of the juncture of the hopper bottom 3 and the discharge conduit 4, the shaft 16 is connected by a coupling member 18 to a feed screw 19 comprising a rotary shaft 20 having a helical, interrupted vane 21 thereon. The feed screw 19 extends below the level of the tube 4a and the vane 21 extends the full length of the shaft 20.

Directly below the discharge conduit 4 is an extruder 22 of conventional construction having an inlet neck 23 provided with an opening in communication with the outlet end of the tube 4a. Material discharged through the conduit 4 thus is received in the extruder and is driven by the latter in the direction of the arrow 24 by a conventional screw feed mechanism (not shown).

The disclosed apparatus includes a base or virgin plastics supply container 25 having a hopper bottom 26 to which is joined one end of a clear delivery tube 27, the opposite end of the tube 27 being joined to an inlet sleeve 28 which communicates at an angle of about 30° with the interior of a cylindrical receiver 29. One end of the receiver is joined to and communicates with the interior of the discharge tube 4a and at a level above the lower or outlet end of the tube. The longitudinal axis of the receiver 29 extends along the line which intersects the longitudinal axis of the tube 4a.

A feed screw mechanism 30 is rotatably accommodated in the receiver 29 and is similar to the feed screw 19 in that it comprises a rotary shaft 31 on which is fixed a helical, interrupted vane or impeller 32. One end of the feed screw 30 terminates at the juncture of the receiver 29 and the conduit 4, whereas the opposite end of the feed screw is coupled to a preferably hydraulic motor 33 which rotates the feed screw in a direction to feed material from the receiver into the conduit 4.

If coloring of the plastics articles to be formed is desired, coloring material may be introduced to the conduit 4 from a supply container 35 mounted on the hopper 1 and having a hopper bottom 36 connected by a tube 37 to a cylinder 38 in which is a rotary feed screw 39 that is driven by a preferably hydraulic motor 40. The discharge end of the cylinder 38 is joined to and communicates with the interior of the tube 4a.

A source of hydraulic power comprises a pump 41 which delivers hydraulic fluid from a reservoir (not shown) thereof to the motors 15, 33, and 40 via fluid lines 42, 43, and 44, respectively. Suitable valves 46, 47, and 48 regulate the flow of fluid to the motors. Although not shown in the drawings, it will be understood that fluid lines extend from the hydraulic motors to the fluid reservoir so as to provide for circulation of the hydraulic fluid.

The construction of the feed screw mechanisms 19 and 30 is best illustrated in FIGS. 3 and 4. For convenience, only the mechanism 19 is illustrated in FIGS. 3 and 4, but it will be understood that the mechanism 30 may be the same.

The interrupted, helical vane 21 is formed by a plurality of individual segments 49, each of which is identical. For convenience, the uppermost segment 49 shown in FIGS. 3 and 4 is identified by the reference character 49a, the next adjacent segment is identified by the reference character 49b, and so on. Each segment comprises a flat member having a curved periphery 50 and opposite side edges 51 and 52. The edge 51 is the leading edge and the edge 52 is the trailing edge. The periphery 50 is formed on an arc having its center at the longitudinal axis of the shaft 20 and having a radius corresponding substantially to the radius of the tube 4a, but sufficiently less than the latter as to provide a small clearance between each segment and the wall of the conduit. The curved periphery 50 of each segment subtends an angle defined by the side edges 51 and 52. In the disclosed embodiment, the subtended angle is substantially 45°, but such angle may vary depending on the kind of material which is to be fed by the screw feeder.

The segment 49a is inclined to the longitudinal axis of the shaft 20 in such manner that rotation of the shaft 20 in one direction will cause the segment 49a to drive material beneath it longitudinally of the conduit 4 toward its discharge end. The angle of inclination of the segment 49a in the disclosed embodiment is substantially 45°, but such angle may vary according to the material to be fed.

Each of the segments 49b – 49p is identical to the segment 49a and is mounted on the shaft 20 in the same manner. Each segment, however, is spaced from its adjacent segment both longitudinally and circumferentially of the shaft so that the segments, as a group, are arranged in the form of a helix. The longitudinal spacing of adjacent segments should be such that a clearance exists between the trailing edge 52 of the upper segment and the leading edge 51 of the next lower segment. It has been found that, when the apparatus is used for the mixing of polyethylene, a longitudinal clearance of about 1 inch is satisfactory. The longitudinal clearance may differ for other plastics, however.

The circumferential spacing of the segments 49 preferably is such that the trailing edge 52 of an upper segment is aligned, in the plane of the longitudinal axis of the shaft, with the leading edge of the next lower segment. Thus, when the feed screw 19 is viewed from one end, as shown in FIG. 4, no gaps between adjacent segments are visible.

Characteristics such as the angular width of the segments 49, their inclination to the axis of the shaft 20, and their spacing longitudinally of the shaft may differ from those described earlier so as to provide for optimum feeding of different kinds of materials at different rates of speed. The best characteristics may be determined empirically.

In the operation of the apparatus, ground scrap material delivered to the scrap hopper 1 is agitated and falls by gravity into the enlarged end of the outlet conduit 4 where it is entrained and fed downwardly by the rotating feed screw 19. Simultaneously, base material is delivered by gravity from the supply container 25 to the receiver 29 and is entrained by the feed screw 30 and fed toward the conduit 4. If coloring material is added, it is delivered from the container 35 into the conduit 4 via the feed screw 39.

Material entrained by a rotating feed screw normally does not rotate, but instead moves axially of the housing in which the feed screw is located. Thus, upon rotation of the feed screw 19, for example, that portion of the contents of the conduit 4 directly beneath a segment 49 is subjected to compressive force urging the material axially of the conduit 4. Each time that a segment rotates past the same portion of material, the axial space between the two adjacent segments enables the compressed material to expand somewhat, thereby resulting in a limited slippage of the feeding movement of the material. The expansion of the compacted material facilitates the introduction of materials to the conduit 4 from the receiver 29 and the cylinder 38 in that the introduction of such materials is not resisted to the same extent that it would be resisted if the material in the conduit could not expand. Since the introduction of base and coloring materials into the conduit 4 is resisted to a lesser extent, a lesser force is required to be imposed on the materials and, consequently, less heat is generated in the materials.

From the conduit 4 the mixture of base, scrap, and coloring materials is delivered to the extruder 22 which operates in the normal manner.

The disclosed embodiment is representative of a presently preferred form of the invention, but is intended to be illustrative rather than definitive thereof. The invention is defined in the claims.

I claim:

1. Apparatus for mixing fluffy scrap and rigid base material and feeding such mixture to an extruder or the like, said apparatus comprising a scrap hopper; an elongate outlet conduit in communication with said hopper for receiving scrap therefrom; means for introducing fluffy scrap to said hopper; scrap feed means extending through said conduit for feeding scrap therethrough; rigid base material supply means; receiver means communicating with said material supply means for receiving therefrom base material and communicating with said outlet conduit between its ends; and base material feed means including a rotary impeller extending through said receiver means for feeding base material from said receiver means into moving scrap in said outlet conduit, whereby said base material may be added to scrap in said outlet conduit, said scrap feed means comprising a shaft rotatable about its longitudinal axis and having an interrupted helical vane thereon.

2. Apparatus according to claim 1 wherein said vane comprises a plurality of individual segments spaced longitudinally and circumferentially of said shaft.

3. Apparatus according to claim 2 wherein each of said segments comprises a substantially flat member having a peripheral edge subtending an angle, each of said members being substantially identical.

4. Apparatus according to claim 3 wherein said angle is substantially 45°.

5. Apparatus according to claim 3 wherein said peripheral edge defines an arc having its center at the longitudinal axis of said shaft.

6. Apparatus according to claim 2 wherein each of said segments is inclined to the longitudinal axis of said shaft.

7. Apparatus according to claim 6 wherein the inclination of each of said segments is substantially 45°.

8. Apparatus according to claim 1 wherein said vane comprises a plurality of individual, substantially uniform segment-shaped members which are substantially uniformly spaced from one another both longitudinally and circumferentially of said shaft.

9. Apparatus according to claim 8 wherein each of said members is substantially uniformly inclined to the axis of said shaft.

10. Apparatus according to claim 9 wherein each of said members has side edges extending from said shaft along lines spaced substantially 45° apart.

11. Apparatus according to claim 10 wherein said members are spaced circumferentially about the axis of said shaft in such manner that one edge of one of said members is substantially coplanar with an edge of the next adjacent one of said members.

12. Apparatus according to claim 1 wherein said base material feed means comprises a shaft rotatable about its longitudinal axis and having an interrupted helical vane thereon.

13. Apparatus according to claim 1 wherein said receiver means and said conduit communicate with one another along lines which intersect at the longitudinal axis of said conduit.

14. Apparatus for mixing fluffy scrap and rigid base material and feeding such mixture to an extruder or the like, said apparatus comprising an upright scrap hopper; an elongate, substantially vertical outlet conduit having its upper end in communication with said hopper for receiving scrap therefrom, said conduit having a lower discharge end; means for introducing fluffy scrap to said hopper; scrap feed means extending from within said hopper into and through said conduit for feeding scrap into and through said conduit, said scrap feed means comprising a rotary shaft having an interrupted helical vane thereon; rigid base material supply means; receiver means communicating with said base material supply means for receiving therefrom base material and communicating with said conduit between the upper and lower ends of the latter, and base material feed means including a rotary impeller extending through said receiver means for feeding base material from said receiver means into moving scrap material in said outlet conduit whereby material discharged from the discharge end of said conduit comprises a mixture of base and scrap materials.

15. Apparatus according to claim 14 wherein said conduit is cylindrical and wherein said vane has a diameter corresponding substantially to the diameter of said conduit.

* * * * *